United States Patent [19]

Zurcher

[11] Patent Number: 4,924,062

[45] Date of Patent: May 8, 1990

[54] METHOD FOR HARDENING DISCRETE IDENTICAL ELEMENTS INTEGRAL WITH A COMMON STRUCTURE AND REGULARLY SEPARATED FROM EACH OTHER AND DEVICE FOR EMBODYING THIS METHOD

[75] Inventor: Erwin Zurcher, Le Lignon, Switzerland

[73] Assignee: Graf & Cie AG, Rapperswil, Switzerland

[21] Appl. No.: 303,113

[22] Filed: Jan. 30, 1989

[30] Foreign Application Priority Data

Feb. 2, 1988 [CH] Switzerland ............................ 349/88

[51] Int. Cl.$^5$ ........................ B23K 26/12; B23K 26/00
[52] U.S. Cl. .................................. 219/121.6; 350/600; 350/321; 148/DIG. 93; 148/903; 219/121.74
[58] Field of Search ....................... 350/600, 628, 321; 148/DIG. 94, DIG. 95:DIG. 93, 903, 4; 219/121.74, 121.75, 121.6

[56] References Cited

U.S. PATENT DOCUMENTS 4,665,298  5/1987  La Rocca ......................... 219/121.6

FOREIGN PATENT DOCUMENTS 2450660  3/1980  France .
60-159112  8/1985  Japan ................................... 148/903

OTHER PUBLICATIONS

IBM Technical Disclosure Bulletin, vol. 27, No. 5, Oct. 1984, D. S. Goodman, "Hemispherical Reflector for Laser Processing".

Primary Examiner—Bruce Y. Arnold
Assistant Examiner—David R. Parsons
Attorney, Agent, or Firm—Cushman, Darby and Cushman

[57] ABSTRACT

A method and apparatus for hardening discrete identical elements, connected to a supporting structure and regularly spaced, by which a laser beam is focused upon the elements as they travel along a path through a hollow sphere containing a mirror on its inside surface. The light reflected by the elements is reflected by the mirror to strike the opposite side of the elements. This process optimizes the radiant energy directed to the elements and produces quick, uniform, well-delineated hardening substantially without a hardness gradient.

6 Claims, 1 Drawing Sheet

METHOD FOR HARDENING DISCRETE IDENTICAL ELEMENTS INTEGRAL WITH A COMMON STRUCTURE AND REGULARLY SEPARATED FROM EACH OTHER AND DEVICE FOR EMBODYING THIS METHOD

FIELD OF THE INVENTION

The present invention concerns a method for hardening discrete, identical elements which are intergral with a common structure and spaced regularly from one another; inter alia the teeth of a dentate member, according to which method there is formed a laser beam, there is defined a path of displacement of said elements, this laser beam is aimed at a point on this path and the light reflected by these elements is again directed to this path; the invention also relates to a device for embodying this method.

In the disclosure which follows, reference is substantially made, in regard to the hardening of identical discrete elements and for exemplifying purpose, to teeth elements and, more particularly, to the teeth of wire clothing. It is however obvious for people skilled in the art that this method is applicable to many kinds of small elements, for instance micromechanical parts which are removably linked to a common structure which can make them move along a common path.

BACKGROUND OF THE INVENTION

To harden the teeth of wire clothing is a very delicate operation because only the tip of the tooth should be hardened while the tooth base must stay unhardened and the hardness gradient area between hardened and unhardened portions should be kept as reduced as possible. Up to now, this operation is effected with a torch. With this heating mode, the maximal speed is ~10m/min. The hardness transition gradient area is relatively narrow but it is not possible to further reduce it as desired. Indeed, admittedly, since this hardening process has been used for many decades, the limits inherent to this heating mode have been reached in regard to speed as well as to hardness and restriction of the transition area.

There has been proposed already in GB 2 139 614 to use a device for cutting glass under thermal shock by means of a laser beam in which the fraction of light energy transmitted through the glass plate is reflected by a mirror against this glass plate. A fraction of the reflected energy is again absorbed by this glass plate and another fraction is transmitted therethrough. This residual energy fraction is then returned against the laser which situation affects its operation.

There has also been proposed in EP-O 174 915 to use an apparatus for finishing metal parts which move along a trajectory by means of a laser beam, this apparatus comprising a mirror arranged on the internal surface of a hemi-ellipsoidal body portion. This body portion is provided with an opening for transmitting the laser beam aimed at one of the foci of the ellipsoid located along the path of displacement of the metal parts, this being at a skew angle to prevent the reflected portion of light energy from being returned against the laser. In this embodiment, the energy condensed at the first focus is reflected by the mirror toward the second focus but, thereafter, the residual beam reflected again by the ellipsoidal mirror is sent back through the entrance opening.

Although this second embodiment avoids the drawbacks of the foregoing first embodiment, it does not however permit capturing the whole laser beam energy which finally exits through the entrance at a different angle, nor does it make it possible to return the reflected portions of this beam to a same given point of the path followed by the metallic parts; after each reflection, the light energy is driven against a different point of this path.

Yet, in order that the hardening be uniform, well delineated and substantially without a hardness gradient, for instance in the case of teeth cut from the edge of a wire, it is necessary, in view of the high density of energy supplied, to simultaneously heat the whole surface of the tooth for a very short time. This heating mode ensures that the heat is evenly distributed and makes it also possible to decrease the irradiation time because the efficiency is increased and to also avoid burning the edges of the teeth.

OBJECT OF THE INVENTION

The aim of the present invention is to propose a method for embodying such heating mode and thus achieve significant progress in regard to product quality and productivity.

SUMMARY OF THE INVENTION

Hence, this invention concerns a method for hardening discrete identical elements integral with a supporting structure and regularly spaced from one another, this being according to claim 1.

BRIEF DESCRIPTION OF THE DRAWINGS

The annexed drawing illustrates, very schematically and for exemplifying purposes, one embodiment of the device for embodying the method of the invention.

SPECIFIC DESCRIPTION

Figure 1:
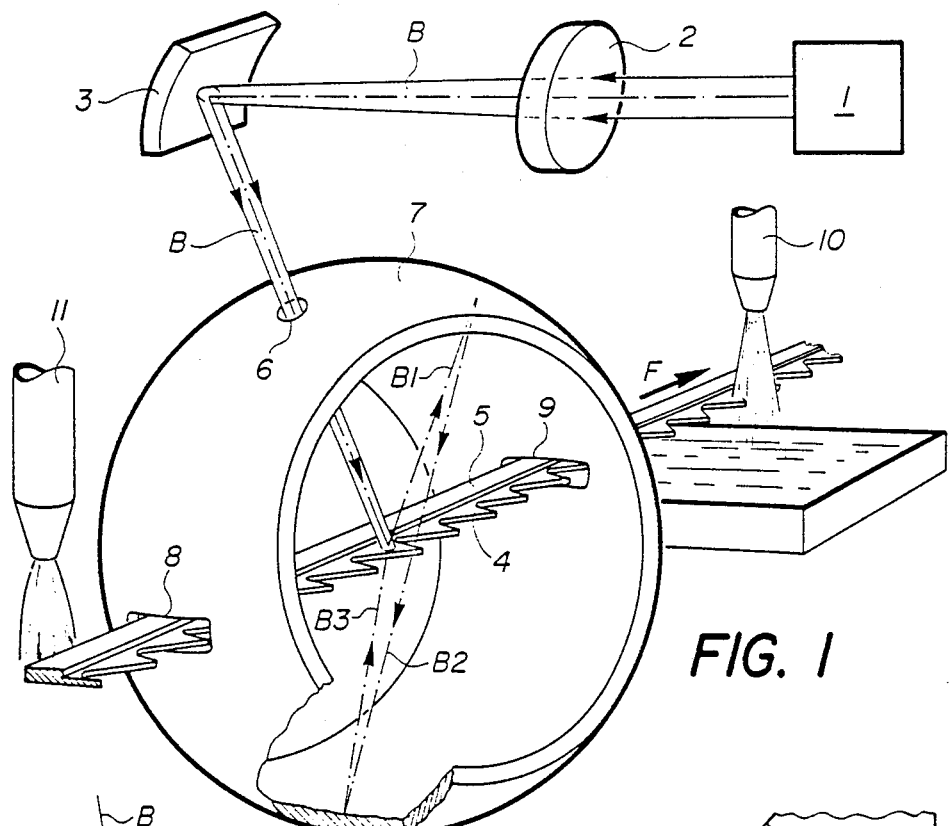
FIG. 1 is a perspective view of this device.

The device illustrated in FIG. 1 comprises a laser beam source 1, a lens 2 to focus a beam of coherent light, a first mirror 3 in the form of a portion of cylinder for directing the beam B against the path followed by the teeth 4 of a wire clothing 5. This cylindrically shaped mirror imparts to beam B an elliptical shape whose great axis is oriented parallel to the longitudinal direction of the wire clothing 5. The beam B having an elliptical form can also be formed by means of a reflection less cylindrical lens which causes in aberration to the laser beam. Between the miror 3 and the wire clothing 5, the beam B crosses an opening 6 provided in a hollow sphere 7 whose internal surface constitutes a mirror which surrounds part of the path followed by the wire clothing 5 and which is provided with an input opening 8 and an output opening 9. The opening 6 for allowing the beam 7 to pass through the wall of the hollow sphere 7, as well as the input 8 and output 9 openings of the wire clothing 5 are in a same diametral plane of the hollow sphere 7. After exiting from the spherical mirror 7, the wire clothing 5 goes through a cooling station comprising a water spray nozzle 10.

Upstream of the hollow sphere 7, there is a gas burner 11 for reheating the wire 5. The purpose of preheating is twofold; on one hand this raises the temperature of the wire so that the energy to be provided by the laser beam is lower and the speed of motion can be increased accordingly, and on the other hand the surface of the steel becomes dark blue, which color better absorbs the radiation from the laser beam and increases efficiency.

For accurately hardening a determined area of the serrated edge 4 of wire clothing 5 and as sharp as possible a transition between the hardened and unhardened portions, it is necessary that heating of the portion to be hardened be as quick and homogeneous as possible. This is why the wire 5 passes through a hollow sphere 7 whose internal surface is mirror-reflective to reflect the fraction of light reflected by the teeth 4 of the wire 5 against the same teeth. By taking account of the spaces between each tooth, one may cause the light B1 reflected by the top of a tooth 4 to be reflected by the spherical mirror 7 through the space between two teeth along path B2 and to fall on the mirror 7 so as to be sent back against the lower face of the tooth 4 according to line B3.

Figure 2A:
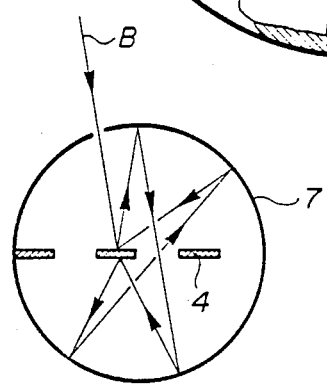
FIG. 2*a* and 2*b* are diagrams which illustrate a reflecting mode.
Figure 2B:
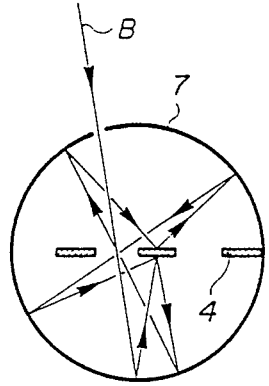

These light reflections can be multiplied, as illustrated in FIGS. 2a and 2b. FIG. 2a illustrates the reflections of the light beam B in the case where the beam penetrates into the spherical mirror to directly strike a tooth 4. FIG. 2b shows the reflections when the entering beam passes between two teeth 4 and strikes the mirror 7 first. As shown, the spherical mirror 7 acts as a definite trap of the entering light beam. Evidently, each reflection by the teeth 4 corresponds to the absorption of a fraction of the light energy of the laser beam to heat the tooth. To achieve this kind of multiple reflection of the laser beam B, the latter is aimed at the teeth of the wire 5, whose path fits within a diametral plane of the sphere 7, and strikes this path at a distance of a fraction of the tooth pitch upstream or downstream to the sphere center. In this example, the fraction is preferably ¼ of the pitch. Using this precaution, the portion of the ray which passes between two teeth 4 is reflected by sphere 7 against the opposite surface of these teeth 4 to ensure that the teeth are heated homogeneously. As can be seen by comparing FIG. 2a and 2b, the points of the path followed by teeth 4 against which the beam B is reprojected are placed symmemtrically with regard to the center of the sphere 7. Indeed, the points are either on right or on left of the center of the sphere 7, depending on whether the beam first strikes a tooth (FIG. 2a) or the mirror 7 (FIG. 2b). Preferably, the laser beam aimed at the path of the wire 5 forms a slight angle with a line falling vertically on this path, this being to avoid it being reflected toward the radiation source which would be affected.

When the teeth leave the irradiation area, the heat which has concentrated in the tip of the teeth flows back to the tooth-base and the wire with the serrated edge. Because of the thermal conductivity of steel and the mass ratio of the heated zones and the cooler parts of the wire, the flow of heat back to the wire is very fast and hardening is limited to the teeth ends 4, this being before the wire 5 is further cooled by the stream of water sparged by nozzle 10.

The method has been successfully implemented with wireclothing of tooth pitch of 1.5 mm by using a 250 W laser beam. The teeth are 0.2 mm thick, 0.6 mm high and the size of the ellipse-shaped spot of coherent light is approximately 0.2–0.3 ×1 mm, the greater axis being parallel to wire-clothing 5. The center of the spot is 0.375 mm (¼ of the pitch distance) upstream of the center of the spherical mirror 7 with respect to the forward direction F of wire 5. The pace of the wire is 15 m/min.

Figure 3:
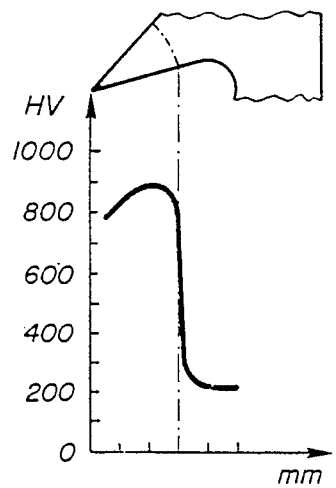
FIG. 3 is a hardness data diagram about a line passing through an element and in a direction transverse to that of the path followed by that element.

The diagram of FIG. 3 represents, in ordinates, the hardness HV values (Vickers units) in function to the distance from the tooth tip. This diagram shows that the transition between the hardened portion and the unhardened portion is surprisingly sharp. The production rate is limited, in this Example, by the laser power with a 500 W laser, the productivity could be twofold. An increase in productivity of this level, when compared with the 10 m/min present flame process, justifies the use of the laser investment, this being paid off within a reasonable period. The improvement on productivity goes together with a better reproducibility and quality, therefore the market value is increased. Thus, as the conventional technology is old, one may admit that performance on quality as well as on productivity can no longer be much improved and is rather far from that of the present technique whose entire resources are not fully explored yet.

As was noted from the previous description, the method and device with which the invention is concerned have important advantages. These advantages mainly result from the use of a spherical mirror which optimizes the use of radiant energy. The portion of this radiant energy reflected by the irradiated surface is reflected by the mirror against the same object, hence the surface of this object can be left shiny and coating with an absorbing layer whose absorbing capacity may not be homomgeneous is not necessary. The method and the mirror make it possible to simultaneously irradiate several faces of the same object which heats up more uniformly. This feature explains why a marked improved quality goes with a significant increased productivity.

I claim:

1. A method of hardening discrete, identically shaped elements integral with a common supporting structure and regularly spaced from each other, inter alia the teeth of a dentate member, according to which there is formed a laser beam, there is defined a path of travel for these elements, the laser beam is aimed at a point of this path and the light reflected by these elements is returned against the same path, characterized in forming a mirror on the internal surface of a hollow sphere, providing through this sphere at least one opening located on a diameter of this sphere that coincides with said path and another opening located in a diametral plane containing this path, but on a radius that forms an oblique angle therewith, directing the laser beam through this other opening against a point of this path situated at a distance from the center of the sphere that corresponds to a fraction of the space between said elements in order that all successive reflections of said beam be trapped within the sphere and that the whole of these reflections converges, at one time, toward this point of said path when they come, alternately, from two opposite directions after crossing the space between two said elements, and at another time toward another point of this path located on this path in symmetry to the first point with regard to the center of the mirror, this occurence being dependent on whether one of said elements intercepts or not said beam which penetrates into the sphere before said beam strikes the surface of said mirror.

2. Method according to claim 1, characterized in forming said laser beam and giving it an elliptical crosssection, and directing this beam against one face of said elements while orienting the greater axis of this elliptical cross-section in parallel to the travelling path of said elements.

3. Method according to claim 1, characterized in that said elements are preheated at a place upstream of where they are when said laser beam is directed thereto.

4. A device comprising a laser beam source, optical means to form a beam of coherent light issuing from that source and to direct this beam against the path defined by the displacement of said elements, a mirror surface to collect the light reflected by the surface of the elements and to direct it against another mirror surface through a space separating two elements, this other mirror surface being arranged to reflect this light against the face of the elements opposite to that face against which the light of said source was initially directed.

5. Device according to claim 4, characterized in that said mirror surfaces are formed on the internal face of a hollow sphere that comprises input and output entrances for said supporting structure and a passage for said beam of coherent light, the travelling path of said suppporting structure substantially passing through the center of said sphere.

6. Device according to claim 5, characterized in that said laser beam is directed against the surface of the supporting structure by forming an angle relative to a vertical line falling on this supporting structure, the center of the light beam intercepting the path of the supporting structure, upstream or downstream of the center of the sphere, at ¼ of the pitch distance between said elements.

* * * * *